United States Patent [19]
Wang

[11] Patent Number: 5,692,455
[45] Date of Patent: Dec. 2, 1997

[54] FLUIDIZED BED PRODUCTION OF OYSTERS AND OTHER FILTER FEEDING BIVALVE MOLLUSKS USING SHRIMP POND WATER

[75] Inventor: Jaw Kai Wang, Honolulu, Hi.

[73] Assignee: University of Hawaii, Honolulu, Hi.

[21] Appl. No.: 47,488

[22] Filed: Apr. 19, 1993

[51] Int. Cl.$^6$ .................................................. A01K 61/00
[52] U.S. Cl. .................................... 119/242; 119/234
[58] Field of Search .................................. 119/207, 209, 119/234, 242, 243

[56] References Cited

U.S. PATENT DOCUMENTS

| | | |
|---|---|---|
| 3,517,648 | 6/1970 | Budge . |
| 3,707,948 | 1/1973 | Dunathan . |
| 4,137,868 | 2/1979 | Pryor ................................ 119/242 X |
| 4,257,351 | 3/1981 | Scura et al. ............................ 119/234 |
| 4,559,902 | 12/1985 | Mason et al. . |
| 4,589,370 | 5/1986 | O'Sullivan . |

FOREIGN PATENT DOCUMENTS

| | | |
|---|---|---|
| 721538 | 11/1965 | Canada . |
| 003885 | 9/1979 | European Pat. Off. . |

OTHER PUBLICATIONS

Jaw-Kai Wang, "Managing Shrimp Pond Water to Reduce Discharge Problems", Aquacultural Engineering, vol. 9, pp. 61–71 (Great Britain 1990).

Wang et al., "Preliminary Investigation of an Oyster–Shrimp Joint Production System", Transactions of the ASAE, vol. 3, pp. 975–980 (U.S.A. 1990).

Lam et al., "Effects of Feed Water Flow Rate on Aquacultured *Crassostrea Virginica*", Aquacultural Engineering, vol. 9, pp. 1017 (Great Britain 1991).

Jakob et al., "Experimental Design of an Oyster Grow–Out System", Cheme Symposium Series, No. 111, pp. 251–262 (U.S.A.).

*Primary Examiner*—Robert P. Swiatek
*Attorney, Agent, or Firm*—James Creighton Wray

[57] ABSTRACT

A land-based, closed facility for the production of bivalve mollusks in a fluidized bed using shrimp pond water. The facility comprises a vertical column built on a base tank that circulates shrimp pond water from a system of pipes. The shrimp pond water flows upward through the vertical column at specific intermediate velocities, allowing oysters in the column to be individually suspended in the fluid currents. The bed remains motionless relative to the column walls. At low velocities, the oysters in the vertical column lie on one another and on the bottom of the column, and at high flow velocities the fluid flow become a hydraulic transport, pushing the oysters out of the column. The column has a vertical viewing window. An overflow valve releases water from the column. Attached to the base tank is a site gauge to determine the pressure of the fluid supplied to the base of the column. The pipe carrying the shrimp pond water to the base tank has two shut-off valves. One is located next to the base tank, and one is located next to the main water supply. The pipe also has a flow control valve and a flow sensor located in between the two shut-off valves. Attached to the opposite side of the base tank is a drain. The shrimp pond water contains the nutrients necessary for the oysters' growth in the fluidized bed column, and the oysters solve the problem of shrimp bed water disposal.

19 Claims, 5 Drawing Sheets

FLUIDIZED BED PRODUCTION OF OYSTERS AND OTHER FILTER FEEDING BIVALVE MOLLUSKS USING SHRIMP POND WATER

BACKGROUND OF THE INVENTION

Current methods of oyster and bivalve mollusk production are labor intensive, adding to the cost of production. Algae has to be produced to feed the oysters. The oysters also have to be cleaned and moved. At present two different systems are used: Traditional culture systems, which raise oysters in natural environments; and land-based culture systems, which raise oysters in artificial environments.

Traditional oyster culture systems include the bottom method, the raft method, the long-line method and the rack method. The bottom method is the simplest and least expensive. Developed over two thousand years ago, oysters are placed on the bottom of near-shore fishing areas. The bottom must be hard to prevent the shells from being buried. That method is hindered by low productivity.

The raft method uses rafts made of poles, for example of about 10–15 meters long, laid parallel to each other about 0.5 meters apart and fastened by wire lashings to lateral beams. The lateral beams suspend seed oysters from the raft. The rafts are fastened end to end in series, with one end anchored to prevent their being carried away.

The long-line method is a modification of the raft method, using a series of floats anchored at each end. Ropes connect the floats and strings are hung from the ropes and hold the oysters.

The rack method uses wooden poles driven into the bottom. The poles support a rack structure connected by horizontal poles. From these poles strings are hung to suspend seed oysters.

The land-based culture systems consist of four basic components: Water procurement, algae culture, oyster culture and waste water disposal. However, no land-based oyster aquaculture system has achieved commercially viable enterprises in the United States.

Upwelling, the flow of water upward in a cylinder or tank for the suspension of solid particles, has been used for the growth of oyster seed. Typically, a large tank has cylinders attached to its side. A pump draws the water mixed with food from the tank and forces it into the cylinders holding the oyster seed. After reaching a specific size, the oyster seed must be removed and placed in an alternate aquaculture system.

Existing methods are constantly threatened by disease, such as MSZ and Dermo. Time and food costs hinder effective, low cost production. It has been estimated that 40%–50% of the cost of oyster aquaculture is in the production of food, and another 30% is taken up by labor. Using traditional methods takes about three years to grow an oyster from seed to market size. The normal meat-shell ratio for an oyster of this type is about 12%. This presents problems of scarcity and supply fluctuations.

The present invention solves problems inherent with current oyster cultivation processes.

Further, traditional culture systems spend almost 30% of total production costs on labor, including cleaning and moving the oysters. Previous land-based aquaculture systems spent 40% to 50% of production cost on food.

Using traditional methods takes about three years to grow an oyster from seed to market size.

SUMMARY OF THE INVENTION

This present production process for cultivating oysters uses fluidized bed technology that feeds the oysters with shrimp pond water, which is full of the right kinds of algae for the bivalves. While the new method has been perfected with oyster cultivation, it may be used with other filter feeding bivalve mollusks, such as clams, cockles, mussels, etc. Fluidized bed technology is used to grow oysters in an upward-flowing column of water.

In fluidized bed technology, fluidization is observed when a bed of solid particles, in this case adult oysters, comes in contact with a vertical upward fluid flow, in an intermediate range of flow rates. At low flow rates or velocities, the solid particles lie on one another and on the porous bottom of the column; they are said to be in a fixed state. A high flow rates or velocities, the solid particles are conveyed out of the column, and this is known as hydraulic transport. For intermediate values, in a range large enough for practical purposes (of the order of 1:10 at least), each particle becomes individually suspended in the fluid flow, while on the whole the bed remains motionless relative to column walls; the bed is said to be fluidized. Using fluidized bed technology, one can produce 2-gram juvenile oysters in six weeks, and 55-gram market size premium half-shell oysters in less than seven months. Additionally, the oysters help reduce the effluent problem of shrimp farms, which has been identified by the seafood aquaculture industry as one of the major problems that must be solved in order to establish a major shrimp farm industry in many areas.

The fluidized bed process requires little labor. It is estimated that six persons can produce 2 million market-size oysters a year. This could reduce labor costs almost 20%. Since shrimp pond water is used for feed, the food is almost free, saving another 40%–50% on production costs. Disease poses less of a threat when using the fluidized bed technology, because the bed may be drained and fresh water may be introduced to kill the bacteria without threatening the lives of the mollusks or significantly altering their environment.

The present invention provides premium grade half-shell oysters year round. Using the fluidized bed method, an oyster can grow to market size in about seven months and have a meat-shell ratio of 16%, thus stabilizing supply.

The fluidized bed incorporates a column of cylindrical structure built upon a base tank that serves as a reservoir for shrimp pond water. The base tank is connected to a shrimp pond water source through a series of pipes. Pumps draw water from a shrimp pond and force it into the base tank. Alternatively, the force of gravity can be used to supply the base tank from the shrimp pond. The flow of shrimp pond water through the pipes is metered, thus enabling the adjustment of valves to control the flow into the base tank and column. Shut-off valves are provided at the shrimp pond source and at the base tank, with the flow sensor and flow control valve provided therebetween.

An alternative flow varying means could be provided between the base tank and the vertical column. In this case, a pump would force water from the base tank upward into the vertical column. Both the first and second means could be used in conjunction.

In either case, the water is forced from the base tank upward into the vertical column at a velocity where the beds of oysters are suspended individually in the algae, bacteria, and other nutrient-rich water supplied from the source. On the whole, the bed remains motionless relative to the column walls.

A fluidization-sensing means is incorporated onto the column for sensing the environment in which the oysters are being cultivated. In a preferred embodiment, the column incorporates a vertical viewing window and a sight gauge used to determine the pressure of fluid flow into the column. An overflow valve drains any excess water away at the top of the column. Thus, manually an operator can adjust the fluid flow by varying the flow through the flow control valve or by varying the output of the base tank pump. An alternate embodiment would provide an automatic pressure sensor within the column, which would detect deviations within the column and instruct the operator of deviations, and automatically alter fluid flow into the column by adjusting the base tank pump or flow control valve.

The overflow serves to drain any excess water away from the column. The valve can be activated manually or automatically from a sensor and can lead back into the base tank, to a drainpipe leading away from the fluidized bed, or both. In the latter case, a valve would enable selectivity of where the overflow would go.

Through these various embodiments, several circulation paths may be selected. In one embodiment, the pond water would be pumped through the open valves of the input pipe into the closed base tank and upward into the column, out of the overflow valve, and into the output drain in a continuous fashion to continuously supply the oysters with fresh nutrients. Alternatively, it would be possible to periodically replenish the base tank by opening the input pipe and subsequently shutting off both input and output pipes. A base tank pump would draw water from the tank and pump it into the column to circulate the nutrients into the column at the desired velocity, while the overflow valve would continuously recycle the overflow back into the tank until nutrients, bacteria and algae are depleted. At that point, the depleted water would be drained while the oysters are provided with fresh shrimp pond nutrient-laden water or being flushed with clean water to inhibit or kill any bacteria growth.

The depleted water exiting through the overflow and/or base tank drain can be diverted back into the shrimp pond where it could serve as replenishment for shrimp aquaculture. Thus, an ecosystem is created between the oyster and shrimp cultivation. The system could be periodically replenished through pipe access to fresh water.

It is not beyond the scope of the present invention to control water input and output into the fluidized bed through the use of a computer. Sensors linked to various critical points in the system, such as the shrimp pond source, input pipe, vertical column or base tank, could provide data related to flow velocity, pressure within the vertical column, Ph values, nutrient impregnation and other relevant aspects of cultivation. The data would then be compiled by the computer and compared to known desired values, thus enabling immediate instruction for operators or automatically adjusting pumps, valves, medicinal or nutrient dispensers, Ph balancers, etc. to achieve the desired environment for the oysters. The desired values for varying aspects of the environment may differ over the cycle from seed to maturity, the evolving values provided in a program allowing automatic alterations at varying stages by the computer. The provision of a computerized system would further cut the cost of labor, and would minimize or eliminate costs of human error.

In a preferred embodiment, the column is a cylinder structure built on a base tank that circulates shrimp pond water rich in algae, bacteria, and other nutrients through a system of pipes and pumps. When a bed of oysters is fluidized in this manner, the oysters are suspended individually in the feeding water and do not touch each other. When these conditions are continually maintained, oysters grow from seed to 55 grams in less than 7 months. Although upwelling has been used in hatcheries for oyster seeds, fluidized bed technology differs significantly and has not been applied to either hatcheries or the cultivation of oysters. The invention discloses a land-based, closed facility for the production of bivalve mollusks on a fluidized bed using shrimp pond water. The facility comprises a vertical column built on a base tank that circulates shrimp pond water from a system of pipes and pumps. The base tank pumps the shrimp pond water upward into the vertical column at certain velocities, allowing the solid particles in the column to become individually suspended in the fluid flow. On the whole, the bed remains motionless relative to the column walls. At low velocities, the solid particles in the vertical column lie on one another and on the bottom of the column, and at high flow velocities the fluid flow becomes a hydraulic transport, pushing the solid particles out of the column. The column itself has a vertical viewing window and an overflow valve which drains any excess water in the column. Attached to the base tank is a site gauge used to determine the pressure of the fluid flow into the column.

Preferably the pipe which carries the shrimp pond water to the base tank has two shut-off valves, one located next to the base tank and one located next to the main water supply. The pipe also has a flow control valve and a flow sensor located in between the two shut-off valves. Attached to the opposite side of the base tank is a drain. The shrimp pond water contains the necessary algae bacteria and other nutrients necessary for the oysters' growth in the fluidized bed column.

These and further and other objects and features of the invention are apparent in the disclosure, which includes the above and ongoing written specification, with the claims and the drawings.

DETAILED DESCRIPTION OF THE DRAWINGS

Figure 1:
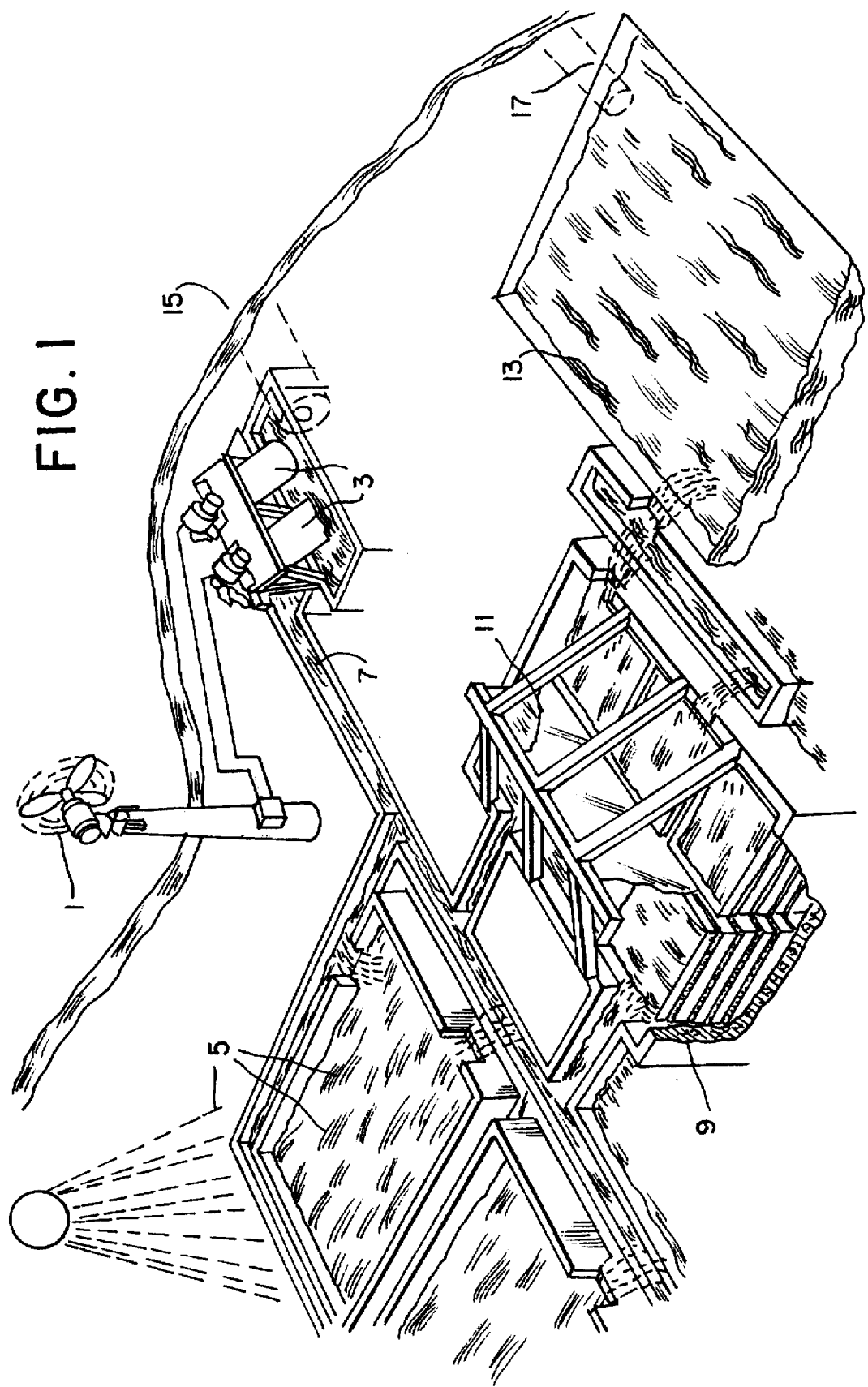
FIG. 1 is a perspective view of a typical land-based culture system.

Referring to FIG. 1, a prior art land-based culture system is shown using a windmill power generator 1 to power pumps 3 which draw water from the ocean 15. The pumps 3 send the seawater through troughs 7 to the algae pond 5. The algae pond 5 mixes the algae grown in the pond 5 with the seawater. The algae-rich water from the algae pond 5 is then sent through a system of troughs 7 mixed with seawater pumped directly from the sea through the troughs 7. The algae-rich seawater and the seawater empty from the troughs into a housing tank 11 for the oysters. The algae-rich seawater is distributed through the housing tank 11 by troughs in canals. The algae-rich water runs over the oysters kept in trays 9 housed in the housing tank 11. The oyster trays 9 are stacked on top of one another and water is filtered through the trays 9 to the bottom of the housing tank 11. The water at the bottom of the housing tank 11 is emptied into a waste water disposal tank 13. The waste water disposal tank 13 uses seaweed to filter the extra algae-rich seawater and returns the water to the ocean 15 through pumps 17.

Figure 2:
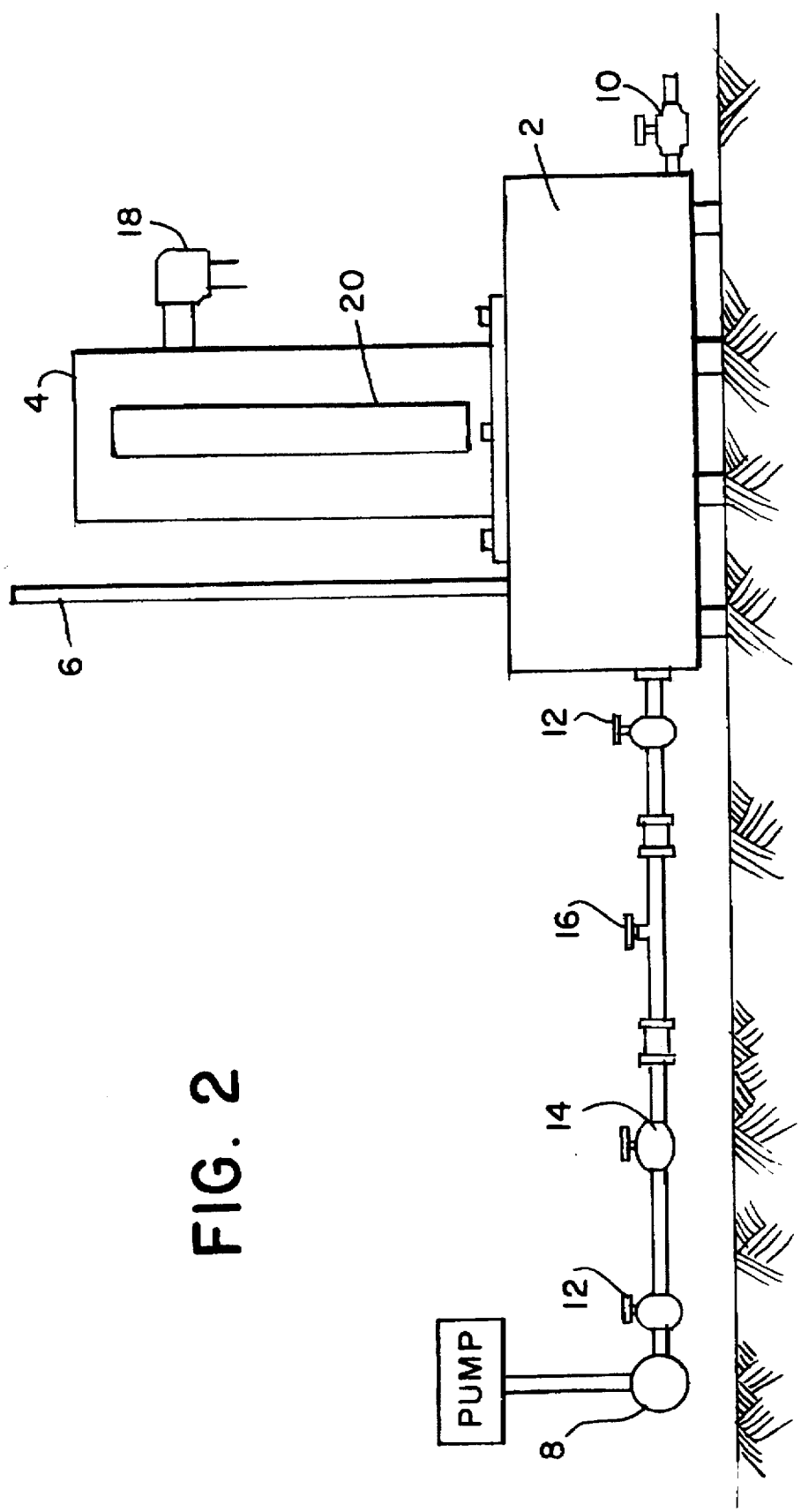
FIG. 2 is a perspective view of the fluidized bed facility.

Referring to FIG. 2, in the present invention the base tank is shown at 2 with the vertical column 4 secured to the top of the base tank 2 by means of bolts. The large base tank is closed and pressurized to provide smooth flow to the fluidized bed column 4. A sight pressure gauge 6 is positioned on top of the base tank 2, next to the vertical column 4. The water supply pipe 8 is connected to the base tank 2. A drain 10 is attached to the base tank 2 opposite the water supply pipe 8. The water supply pipe 8 comprises two shut-off valves 12, a flow control valve 14, and a flow sensor 16 between the two shut-off valves 12. The vertical fluidized bed column 4 further comprises a viewing window 20 and an overflow valve 18.

Shrimp pond water is pumped from the source directly or indirectly via a pressurization tank through the water supply pipe 8 to the base tank 2. A flow control valve 14 is set to send a predetermined amount of shrimp pond water necessary to maintain a sufficient amount of water in the base tank 2 for fluidization of the bivalve mollusks in the vertical column 4. A flow sensor 16 monitors the flow of the water through the water supply pipe 8. Shut-off valves 12 are located adjacent the base tank 2 and on the other side of the flow control valve 14 for stopping the flow to the base tank 2 when desired.

The pump or pressure source provides the pressure differential shown in the sight gauge inside the base tank 2 and forces the shrimp pond water up into the vertical column 4 at predetermined medium flow rates. A low velocity would permit the bivalve mollusks up rest on each other and on the bottom of the vertical column 4, while a high velocity setting would push the bivalve mollusks up the vertical column 4, acting as a hydraulic transport.

Figure 3:
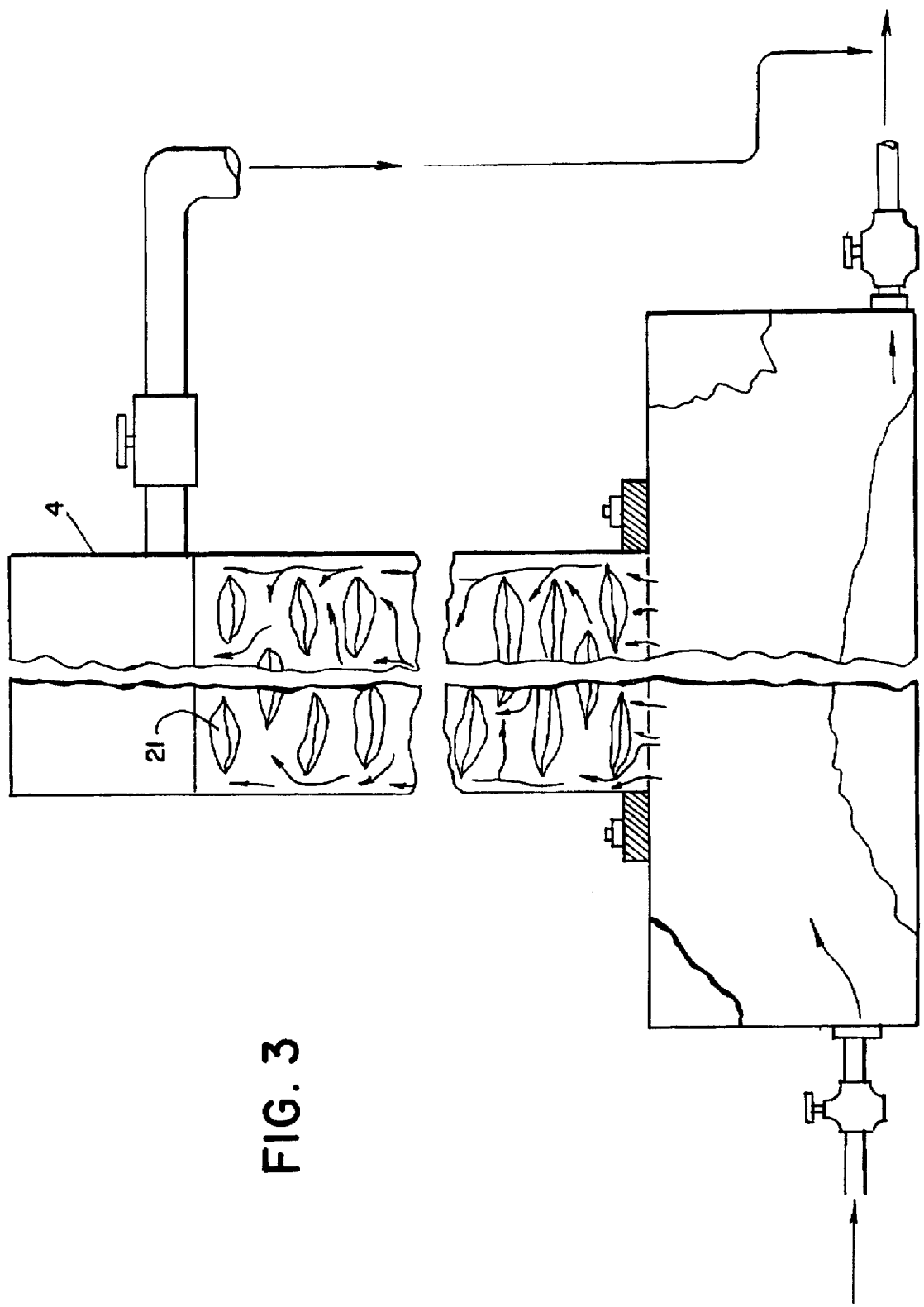
FIG. 3 is a side view of the column showing the bed in a fluidized state.

As shown in FIG. 3, a medium velocity setting suspends the bivalve mollusks in the fluid flow. The mollusks 21 remain motionless relative to the walls of the vertical column 4 while algae, bacteria and nutrients in the shrimp pond water flow around the mollusks, allowing the mollusks to feed. The mollusks may randomly touch one another or the sides of the vertical column 4 while in the fluidized state, but the animals do not support the weight of their neighbors. Flow is facilitated, suspension is provided and the shells easily open for filter-like feeding.

Figure 4:
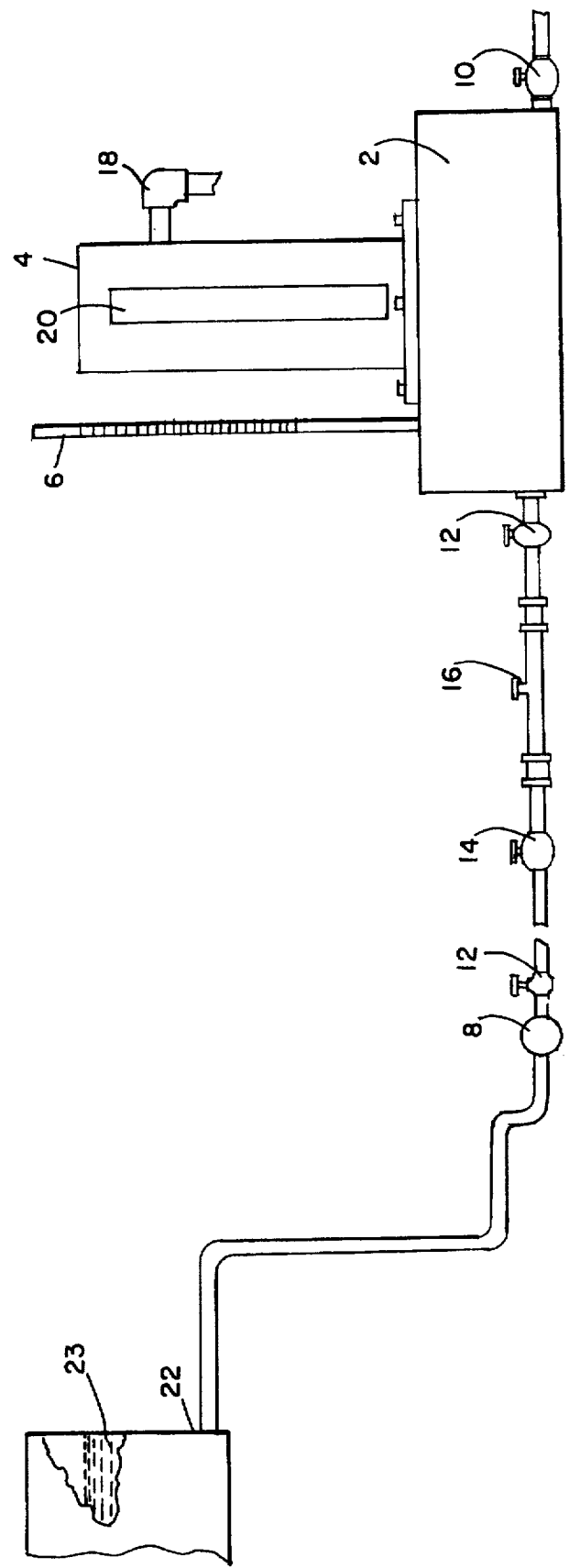
FIG. 4 is a perspective view of the fluidized bed facility and the shrimp pond.

Referring to FIG. 4, a viewing window 20 allows the bivalve mollusks to be monitored and watched by workers. The pressure sight gauge 6 monitors the pressure of the water from the base tank 2 into the vertical column 4. An overflow 18 maintains the water level of the vertical column 4 by releasing the constantly flowing water. The tank top may be open or closed. A removable closure is preferred to permit harvest and cleaning. Harvesting may be accomplished by lifting a stainless steel basket disposed in the column, or by increasing the flow rate to hydraulically transport market size oysters through an overflow. The bottom of the column is foraminous to provide uniform flow in a preferred embodiment. Alternately, diverters or funnel shapes may be used to divert and promote flow throughout the entire bed.

A drain 10 permits the base tank 2 and vertical column 4 to be drained for cleaning the facility, for the introduction of fresh water into the vertical column 4 to clean the bivalve mollusks for the prevention of disease, or for the removal of the bivalve mollusks.

An elevated shrimp pond 22 feeds the shrimp pond water 23 to the base tank 2 through the water supply pipe 8. The flow of the shrimp pond water through the water supply pipe 8 is controlled by two shut-off valves 12, a flow control valve 14, and a flow sensor 16.

Figure 5:
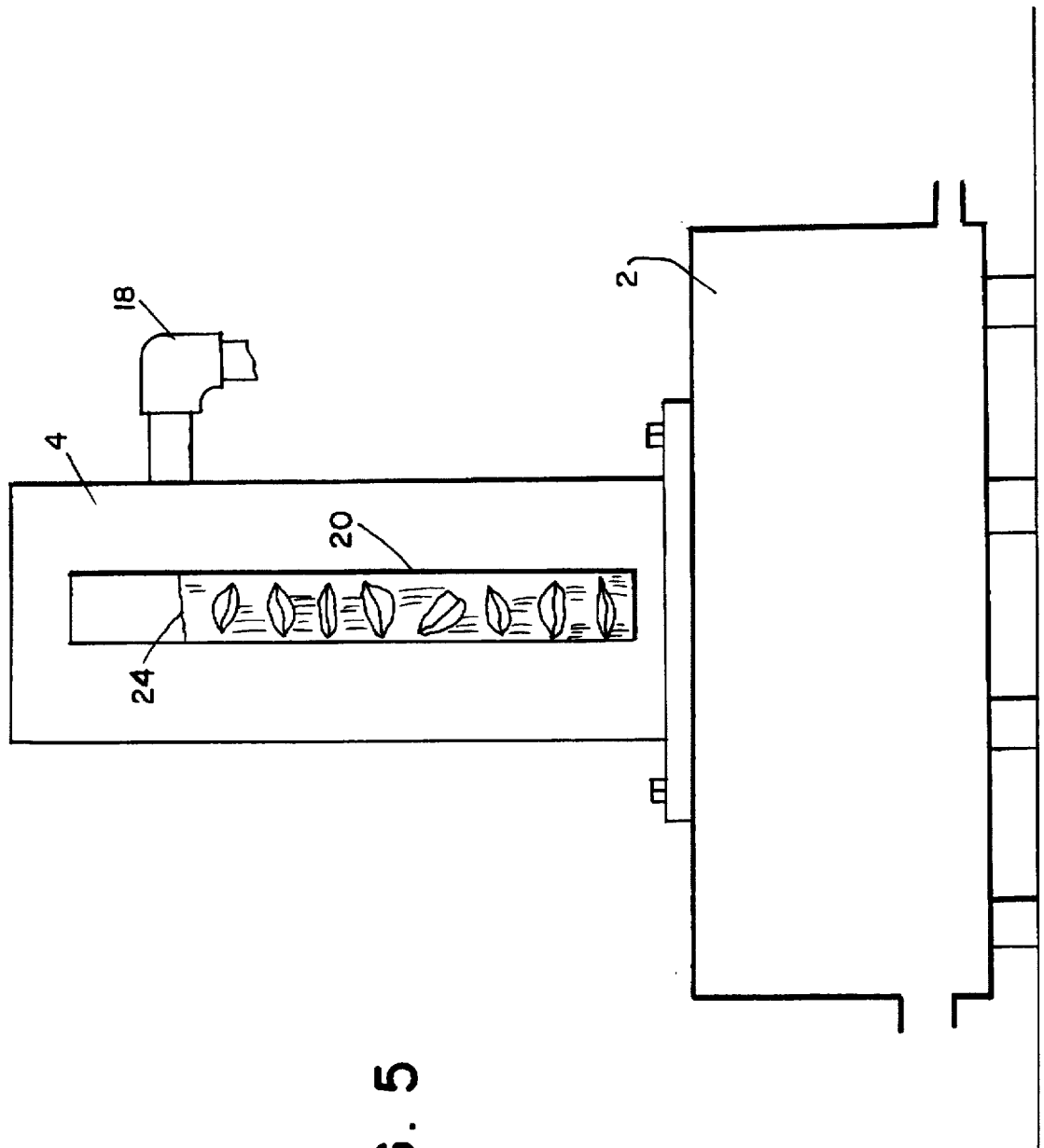
FIG. 5 is a side view of the base tank and vertical column with oysters fluidized in the vertical column.

FIG. 5 shows a side view of the base tank 2 and the vertical column 4. The viewing window 20 on the vertical column 4 shows the oysters in a fluidized state. Shrimp pond water in base tank 2 flows upward into the vertical column 4 at a constant pressure, causing the oysters in the vertical column to be suspended independently without resting upon one another or on the base of vertical column 4, and remaining motionless relative to the walls of the vertical column 4. The surface of the shrimp pond water in the vertical column 4 is shown at 24. The shrimp pond water in the base tank is maintained at a certain pressure, as schematically shown in the sight gauge. Shrimp pond water from the base tank 2 is pumped upward into the vertical column 4. The suspended oysters feed on the nutrient-rich shrimp pond water as it flows around them. Fresh shrimp pond water is continuously pumped from the base tank 2 into the vertical column 4, and used water is disposed of through the overflow valve 18.

While the invention has been described with reference to specific embodiments, modifications and variations of the invention may be constructed without departing from the scope of the invention, which is defined in the following claims.

I claim:

1. A land-based bivalve mollusk production apparatus, comprising:

a closed, pressurizable base tank;

a vertical fluidized bed column connected to a top of the base tank;

a shrimp pond water source;

a pressure source connected to the water source;

a water supply pipe attached to the pressure source and to the base tank for carrying the shrimp pond water from the pressure source to the base tank;

a drain attached to the base tank; and a regulator for regulating the fluid flow from the base tank into the vertical column at a velocity for suspending adult bivalve mollusks in the fluid flow in the column.

2. The invention according to claim 1, further comprising a viewing window in the vertical column and further comprising an overflow valve near the top of the vertical column.

3. The invention of claim 1, wherein the pressure source comprises a pump for circulating the shrimp pond water through the base tank and through the vertical column.

4. The invention according to claim 1, further comprising two first and second shut-off valves on the main water supply pipe, the first between the regulator and the base tank and the second between the regulator and the water supply inlet, the regulator comprising a flow control valve on the main water pipe, and further comprising a flow sensor in between the two shut-off valves.

5. The invention according to claim 1, wherein the drain for the release of water in the base tank is located in a bottom of the base tank opposite the water supply pipe.

6. The invention according to claim 1, wherein the pressure source comprises a pump for circulating water from the source to the base tank by way of the water supply pipe.

7. The invention according to claim 1, wherein the pressure source comprises a pump for circulating water from the base tank into the vertical column, and wherein the regulator is a flow control valve for providing a steady fluid flow in the fluidized bed column for suspending the bivalve mollusks in the vertical column.

8. The invention according to claim 7, further comprising a pressure gauge for determining pressure in the base tank below the vertical column.

9. The invention according to claim 1, wherein fresh water may be substituted for shrimp pond water for rinsing and cleaning of the bivalve mollusks for the prevention of disease.

10. A method for the production of bivalve mollusks in a land-based facility, comprising:

circulating shrimp pond water from a base tank upward into a vertical column containing adult bivalve mollusks;

piping the water from a shrimp pond source to the base tank;

suspending the bivalve mollusks in the vertical column;

gauging the pressure in the base tank;

draining water by a drain attached to the side of the base tank;

releasing excess water from the vertical column through an overflow attached to the vertical column;

regulating the flow of the shrimp pond water to the base tank; and measuring the flow of the shrimp pond water to the base tank by a flow sensor located between the regulator and the base tank.

11. The method of claim 10, comprising producing bivalve mollusks in nutrient rich shrimp pond water.

12. The method of claim 10, substituting the shrimp pond water with fresh water in the base tank and vertical column for rinsing and cleaning the mollusks.

13. A land-based consumable bivalve mollusk fluidized bed production facility, comprising a fluidized bed for cultivating mollusks to maturity, a source of shrimp pond water for feeding the mollusks, and a flow control means for regulating flow of shrimp pond water upward within the fluidized bed, further comprising a closed column of sufficient size to hold mature mollusks, a base tank attached to the bottom of the column for supplying shrimp pond water to the column, an inlet for supplying shrimp pond water to the base tank from said shrimp pond water source, and an outlet attached to the tank for removal of nutrient-depleted pond water.

14. The apparatus of claim 13, further comprising a viewing window on the closed vertical column for sighting the individually suspended mollusks, a sight gauge connected to the base tank, and a flow control connected to the fluidized bed, said control comprising a regulator for regulating the fluid flow into the vertical column at a velocity for suspending bivalve mollusks with water currents within the column, and an overflow near the top of the vertical column.

15. The apparatus of claim 13, further comprising a flow sensor within the apparatus for measuring velocity of water flow into the column, and a flow control connected to the inlet for controlling water velocity through the column.

16. The apparatus of claim 15, wherein the flow sensor is connected to a pipe supplying the base tank beneath the vertical column, and the flow control is a regulator in the pipe supplying the base tank and the vertical column.

17. The apparatus of claim 15, wherein the flow sensor is placed on said inlet between the shrimp pond water source and the base tank, and the flow control means incorporates an adjacent flow control valve or a drain on the base tank outlet.

18. The apparatus of claim 17, wherein the inlet further comprises two shut-off valves, one at the base tank and the second at the shrimp pond water source, the flow sensor and flow control valve in between the two shut-off valves.

19. The apparatus of claim 18, wherein the water is fed from the shrimp pond and is forced through gravitation through the inlet supply and out through the base tank and vertical column.

* * * * *